US012800738B2

(12) United States Patent
Tsai et al.

(10) Patent No.: US 12,800,738 B2
(45) Date of Patent: Nov. 17, 2026

(54) OPTICAL SENSOR DEVICE CALIBRATION

(71) Applicant: Artilux, Inc., Menlo Park, CA (US)

(72) Inventors: Ming-Hsi Tsai, Hsinchu County (TW); Chih-Wei Yeh, Hsinchu County (TW)

(73) Assignee: Artilux, Inc., Menlo Park, CA (US)

( * ) Notice: Subject to any disclaimer, the term of this patent is extended or adjusted under 35 U.S.C. 154(b) by 293 days.

(21) Appl. No.: 18/799,631

(22) Filed: Aug. 9, 2024

(65) Prior Publication Data

US 2025/0067856 A1 Feb. 27, 2025

Related U.S. Application Data

(60) Provisional application No. 63/520,919, filed on Aug. 21, 2023.

(51) Int. Cl.

| | |
|---|---|
| ***G01J 5/06*** | (2022.01) |
| ***G01J 5/53*** | (2022.01) |
| ***G01J 5/56*** | (2006.01) |
| ***G01S 7/497*** | (2006.01) |
| ***G01S 17/86*** | (2020.01) |
| *G06F 3/01* | (2006.01) |

(52) U.S. Cl.

CPC ............... *G01S 7/497* (2013.01); *G01J 5/064* (2022.01); *G01J 5/53* (2022.01); *G01J 5/56* (2013.01); *G01S 17/86* (2020.01); *G01J 2005/066* (2013.01); *G06F 3/011* (2013.01)

(58) Field of Classification Search

CPC ........ G01J 2005/066; G01J 5/064; G01J 5/53; G01J 5/56; G01S 17/86; G01S 7/497; G06F 3/011

See application file for complete search history.

(56) References Cited

U.S. PATENT DOCUMENTS

| | | | | |
|---|---|---|---|---|
| 7,443,894 | B2 | 10/2008 | Riddle et al. | |
| 9,392,660 | B2 | 7/2016 | Dias et al. | |
| 9,778,786 | B1 | 10/2017 | Tong et al. | |
| 2015/0088002 | A1* | 3/2015 | Podhajsky | G16C 99/00 600/479 |
| 2017/0343473 | A1* | 11/2017 | Cook | G01N 21/86 |
| 2018/0123818 | A1* | 5/2018 | Shinar | F04D 25/088 |
| 2023/0048503 | A1 | 2/2023 | Elmfors | |

* cited by examiner

*Primary Examiner* — Nan-Ying Yang
(74) *Attorney, Agent, or Firm* — Dority & Manning, P.A.

(57) ABSTRACT

An optical sensor device for object detection includes a light-emitting element configured to emit light to the object, a light-receiving element configured to sense reflected light from the object, a temperature sensor configured to provide a temperature signal in response to an ambient temperature, a temperature compensation unit coupled to the temperature sensor to read the temperature signal and perform a temperature compensation process to generate a compensated signal strength, and an analyzer coupled to the temperature compensation unit and configured to receive the compensated signal strength and generate a detection result. The temperature compensation process includes receiving a first signal strength when the light-emitting element is turned off, receiving a second signal strength when the light-emitting element is activated, obtaining a compensation factor according to the temperature signal, and generating the compensated signal strength based on the first signal strength, the second signal strength, and the compensation factor.

20 Claims, 5 Drawing Sheets

OPTICAL SENSOR DEVICE CALIBRATION

RELATED APPLICATIONS

The subject application claims the benefit of priority to U.S. Provisional Patent Application No. 63/520,919 filed on Aug. 21, 2023 entitled "Optical Sensor Device Calibration," which is incorporated by reference herein in its entirety for all purposes.

FIELD

The present disclosure relates generally to calibration technology for use with optical sensor devices (e.g., object detection sensor devices) and related applications.

BACKGROUND

Optical sensor devices are being used in many systems, such as smartphones, wearable electronics, robotics, and autonomous vehicles, etc. for proximity detection, 2D/3D imaging, object recognition, image enhancement, material recognition, color fusion, health monitoring, and other relevant applications. The optical sensor device can be operable for different wavelength ranges, including visible (e.g., wavelength range 380 nm to 780 nm, or a similar wavelength range as defined by a particular application) and non-visible light. The non-visible light includes near-infrared (NIR, e.g., wavelength range from 780 nm to 1000 nm, or a similar wavelength range as defined by a particular application) and short-wavelength infrared (SWIR, e.g., wavelength range from 1000 nm to 3000 nm, or a similar wavelength range as defined by a particular application) light.

Many optical sensor devices require a stable operation even if the ambient temperature changes. The present disclosure discloses an optical sensor device that includes a temperature compensation mechanism implemented on a sensing signal to obtain an accurate sensing signal that compensates the effects of ambient temperature variations.

SUMMARY

Aspects and advantages of embodiments of the present disclosure will be set forth in part in the following description, or may be learned from the description, or may be learned through practice of the embodiments.

One example aspect of the present disclosure is directed to an optical sensor device configured to perform detection of an object. The optical sensor device includes a light-emitting element configured to emit light to the object. The optical sensor device includes a light-receiving element configured to sense reflected light from the object. The optical sensor device includes a temperature sensor configured to provide a temperature signal in response to an ambient temperature. The optical sensor device includes a temperature compensation unit coupled to the temperature sensor to read the temperature signal and configured to perform a temperature compensation process to generate a compensated signal strength. The optical sensor device includes an analyzer coupled to the temperature compensation unit and configured to receive the compensated signal strength to process and to generate a detection result. The temperature compensation process includes: receiving a first signal strength (SS_OFF) when the light-emitting element is turned off, receiving a second signal strength (SS_ON) when the light-emitting element is activated, obtaining a compensation factor according to the temperature signal, and generating the compensated signal strength based on the first signal strength (SS_OFF), the second signal strength (SS_ON), and the compensation factor.

In some implementations, the temperature compensation process comprises calculating a third signal strength from a difference between the second signal strength (SS_ON) and the first signal strength (SS_OFF).

In some implementations, the temperature compensation process comprises compensating the third signal strength with the compensation factor to generate the compensated signal strength.

In some implementations, the optical sensor device further includes a storage medium coupled to the temperature compensation unit to store a temperature variation data of the light-emitting element.

In some implementations, the compensation factor is obtained from the temperature variation data of the light-emitting element according to the temperature signal.

In some implementations, the temperature compensation process comprises calculating a temperature difference ($\Delta T$) between a reference temperature signal and the temperature signal.

In some implementations, the reference temperature signal is represented as room temperature.

In some implementations, the compensation factor is obtained according to the temperature difference.

In some implementations, the compensation factor is determined based on a rate of change in radiant flux of the light-emitting element across a temperature.

In some implementations, the compensation factor is further determined based on a rate of change in quantum efficiency of the light-receiving element across a temperature.

In some implementations, the analyzer is configured to perform at least one of skin detection, a bio-information calculation, and substance detection.

In some implementations, the optical sensor device further includes an A/D circuit coupled between the light-receiving element and the temperature compensation unit.

In some implementations, the A/D circuit is configured to convert an analog signal received from the light-receiving element into a digital signal representing signal strength.

Another example aspect of the present disclosure is directed to a method of temperature compensation of an optical sensor device that includes a light-emitting element, a light-receiving element, a temperature sensor, and a temperature compensation unit. The method includes receiving, by the temperature compensation unit, a first signal strength (SS_OFF) when the light-emitting element is turned off. The method includes receiving, by the temperature compensation unit, a second signal strength (SS_ON) when the light-emitting element is activated. The method includes providing, by the temperature sensor, a temperature signal in response to an ambient temperature. The method includes obtaining, by the temperature compensation unit, a compensation factor according to the temperature signal. The method includes generating, by the temperature compensation unit, a compensated signal strength according to the first signal strength (SS_OFF), the second signal strength (SS_ON), and the compensation factor.

In some implementations, the method further includes calculating, by the temperature compensation unit, a third signal strength from a difference between the second signal strength (SS_ON) and the first signal strength (SS_OFF).

In some implementations, the method further includes compensating, by the temperature compensation unit, the third signal strength with the compensation factor to generate the compensated signal strength.

In some implementations, the method further includes obtaining, by the temperature compensation unit, the compensation factor from a storage medium according to the temperature signal.

In some implementations, the method further includes calculating, by the temperature compensation unit, a temperature difference (ΔT) between a reference temperature signal and the temperature signal.

In some implementations, the reference temperature signal is represented as room temperature.

In some implementations, the compensation factor is obtained according to the temperature difference.

Other example aspects of the present disclosure are directed to systems, methods, apparatuses, sensors, computing devices, tangible non-transitory computer-readable media, and memory devices related to the described technology.

These and other features, aspects and advantages of various embodiments will become better understood with reference to the following description and appended claims. The accompanying drawings, which are incorporated in and constitute a part of this specification, illustrate embodiments of the present disclosure, and together with the description, serve to explain the related principles.

BRIEF DESCRIPTION OF THE DRAWINGS

The foregoing aspects and many of the advantages of this application will become more readily appreciated as the same becomes better understood by reference to the following detailed description, when taken in conjunction with the accompanying drawings.

DETAILED DESCRIPTION

Figure 1A:
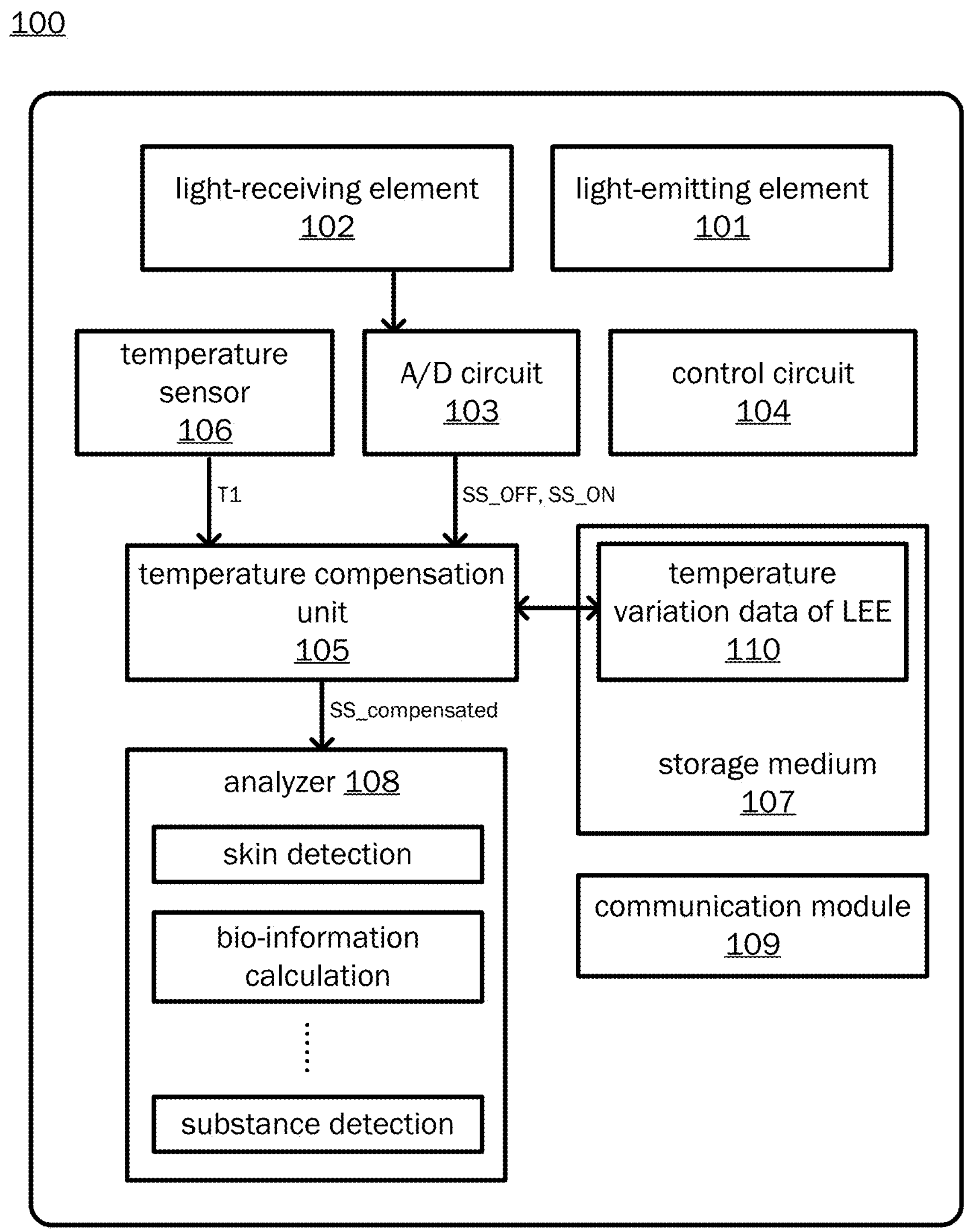
FIG. 1A shows a schematic view of an optical sensor device in accordance with one embodiment of the present disclosure.

The following embodiments accompany the drawings to illustrate the concept of the present disclosure. In the drawings or descriptions, similar or identical parts use the same reference numerals, and in the drawings, the shape, thickness, or height of the element can be reasonably expanded or reduced. The embodiments listed in the present application are only used to illustrate the present application and are not used to limit the scope of the present application. Any obvious modification or change made to the present application does not depart from the spirit and scope of the present application.

An optical sensor device can be assembled in an apparatus to be configured to perform detection of an object. In general, the optical sensor device includes one or more light-emitting elements and one or more light-receiving elements to perform optical detection. The optical power of the light-emitting element and the signal strength of the sensing signal from the light-receiving element could be affected by the ambient temperature. The variation of the signal strength of the sensing signal needs to be minimized to provide accurate detection results. The variation may come from the temperature characteristics of the light-emitting element (e.g., radiant flux) and/or the temperature characteristics of the light-receiving element (e.g., quantum efficiency, noises, etc.). Hence, it is beneficial to implement a compensation or a calibration mechanism for the signal strength of the sensing signal with variation over the ambient temperature in the optical sensor device to achieve accurate detection. In some cases, the manufacturer of the optical sensor (e.g., optical module) can measure the variation of the sensing signal with the temperature changes for each optical sensor and store it in a storage medium, such as a look-up table, for compensation or calibration usage. This may require extra storage space and prolonged measurements (e.g., measuring multiple data points over multiple temperatures), which may cause inefficiency and increase the manufacturing cost. The present disclosure sets forth a temperature compensation method that uses less storage space and does not require temperature varying measurements for individual sensors, to improve efficiency and reduce manufacturing costs.

FIG. 1A shows a schematic view of an optical sensor device 100 in accordance with one embodiment of the present disclosure. The optical sensor device 100 can be arranged in portable apparatus (e.g., a mobile phone, a handheld instrument, an earbud, a pair of glasses, a helmet, a wristband, or a watch). The optical sensor device 100 includes a light-emitting element 101, a light-receiving element 102, an Analog/Digital (A/D) circuit 103, a control circuit 104, a temperature compensation unit 105, a temperature sensor 106, a storage medium 107, an analyzer 108, and a communication module 109. The light-emitting element 101 is configured to emit one or more optical signals (e.g., SWIR lights) to an object to perform one or more tasks (e.g., proximity detection or measure the characteristics of the object). The light-emitting element 101 can be semiconductor light-emitting units, such as a light-emitting diode (LED), a laser diode, a vertical-cavity surface-emitting laser (VCSEL), or an organic light-emitting diode (OLED). The light-emitting element 101 can emit light corresponding to the detecting wavelength of the light-receiving element 102.

The light-receiving element 102 is configured to receive the reflected light from the object and provide an electrical signal representing received signal strength. The light-receiving element 102 can include a single photoelectronic unit or a plurality of photoelectronic units arranged in an array. In an embodiment, the light-receiving element 102 includes a plurality of photoelectronic units arranged in a one-dimensional array or a two-dimensional array. The photoelectronic unit can include a supporting substrate and a detecting region supported by the supporting substrate. The detecting region can include group-IV materials or group-III-V materials configured to absorb photons. The group-IV materials can include silicon (Si) or germanium (Ge), or a material compound of Si and Ge. The supporting substrate can include a material, such as silicon (Si), different from that of the detecting region. The light-receiving element 102 can detect visible light, or non-visible light according to the application. The visible light can include blue, navy, green, yellow, or red light. The non-visible light can include NIR or SWIR.

The A/D circuit 103 can be coupled to the light-receiving element 102 and configured to convert an analog signal received from the light-receiving element 102 into a digital signal (e.g., 8-digit ADC code) representing the signal strength of the reflected light. The control circuit 104 is coupled to the light-emitting element 101 and the light-receiving element 102 and is configured to control the power level, emission period, spectrum, and frequency of emission of the light-emitting element 101. The control circuit 104 also can be configured to control the light-receiving element 102 (e.g., bias level, turn on/off, etc.). The temperature sensor 106, such as a thermistor and a thermocouple, is configured to sense an ambient temperature and provide a temperature signal to the temperature compensation unit 105.

The temperature compensation unit 105 is coupled to the temperature sensor 106 to read the temperature signal indicative of an ambient temperature, and coupled to the light-receiving element 102 to receive the signal strength (SS) indicative of a strength of the sensing signal. The temperature compensation unit 105 is configured to implement a temperature compensation process to compensate the signal strength (SS) to provide more accurate signal strength (SS_compensated) to the analyzer 108 for subsequent processing. Hence, the analyzer 108 can receive a calibrated sensing signal that is less affected by changes in the ambient temperature for subsequent processing to obtain more accurate detection results. In an embodiment, the A/D circuit 103 can be coupled between the light-receiving element 102 and the temperature compensation unit 105 to generate ADC codes in response to the signal strength from the light-receiving element 102. The temperature compensation unit 105 is configured to receive the ADC code from the A/D circuit 103 in response to the signal strength of the sensing signal and perform a temperature compensation process to generate compensation factors to compensate the ADC codes from the A/D circuit 103, thereby providing the analyzer 108 with more accurate ADC codes for subsequent processing.

The storage medium 107 can be coupled with at least one of the temperature compensation unit 105, the analyzer 108, and the control circuit 104, and may include one or more non-transitory processor-readable memories that store essential parameters and coefficients, for example, the temperature variation data of the light-emitting element (LEE) 110 for temperature compensation unit 105 to perform temperature compensation operations.

The analyzer 108 is coupled to the temperature compensation unit 105 to receive the compensated signal strength and to analyze the sensing signal to determine a detection result (e.g., proximity) or to indicate a characteristic (e.g., material composition, moisture, etc.) of the object. The analyzer 108 may include one or more analysis units for different applications, such as a skin detection unit, a bio-information calculation unit, and/or a substance detection unit. The communication module 109 may include a wireless or wired transceiver configured to communicate with one or more devices to display the detection result over LAN, MAN, and/or WAN. In one embodiment, the wireless transceiver may support Bluetooth Low Energy (BLE), IEEE 802.11ah, Zigbee, IEEE802.15-11, or WLAN (IEEE802.11 standard protocol).

Figure 1B:
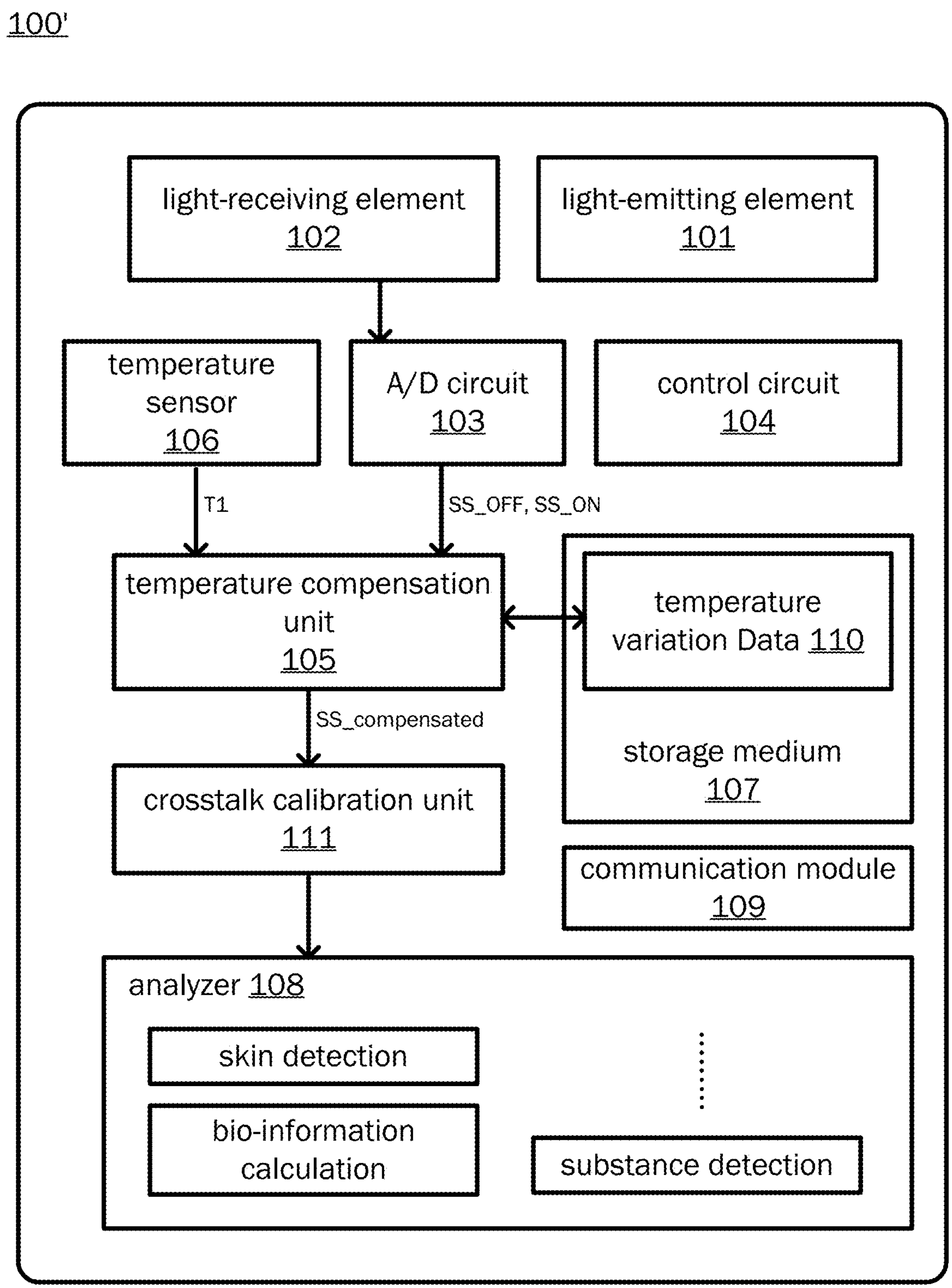
FIG. 1B shows a schematic view of an optical sensor device in accordance with another embodiment of the present disclosure.

The light-receiving element 102 of the optical sensor device 100 may receive undesirable interference light such as internal interference light leaked from the light-emitting element 101 through the device package without being reflected by the object, light from other light sources, or ambient light. The undesirable interference light may introduce crosstalk interference to the sensing signal, causing the analyzer 108 to produce an inaccurate determination. In another embodiment, the optical sensor device may include a crosstalk calibration unit that is configured to eliminate the crosstalk interference in the sensing signal. FIG. 1B shows a schematic view of an optical sensor device 100' in accordance with another embodiment of the present disclosure. The optical sensor device 100' is similar to the optical sensor device 100 and further includes a crosstalk calibration unit 111 coupled to the temperature compensation unit 105 and the analyzer 108. The crosstalk calibration unit 111 receives the compensated signal strength SS_compensated from the temperature compensation unit 105 and performs a crosstalk calibration process to eliminate the crosstalk interference caused by the device package to provide a more accurate signal indicative of the signal strength of the sensing signal. A value X representing a crosstalk interference can be measured during manufacture and stored in the crosstalk calibration unit 111 or storage medium 107. In an embodiment, the crosstalk calibration process can be performed by a function SS_compensated−X. In another embodiment, if the temperature at which the X value is measured is different from the calibrated reference temperature, the crosstalk calibration unit 111 can include a temperature compensation unit (not shown) for compensating the value X before performing the crosstalk calibration process to obtain a more accurate crosstalk calibration.

Figure 2:
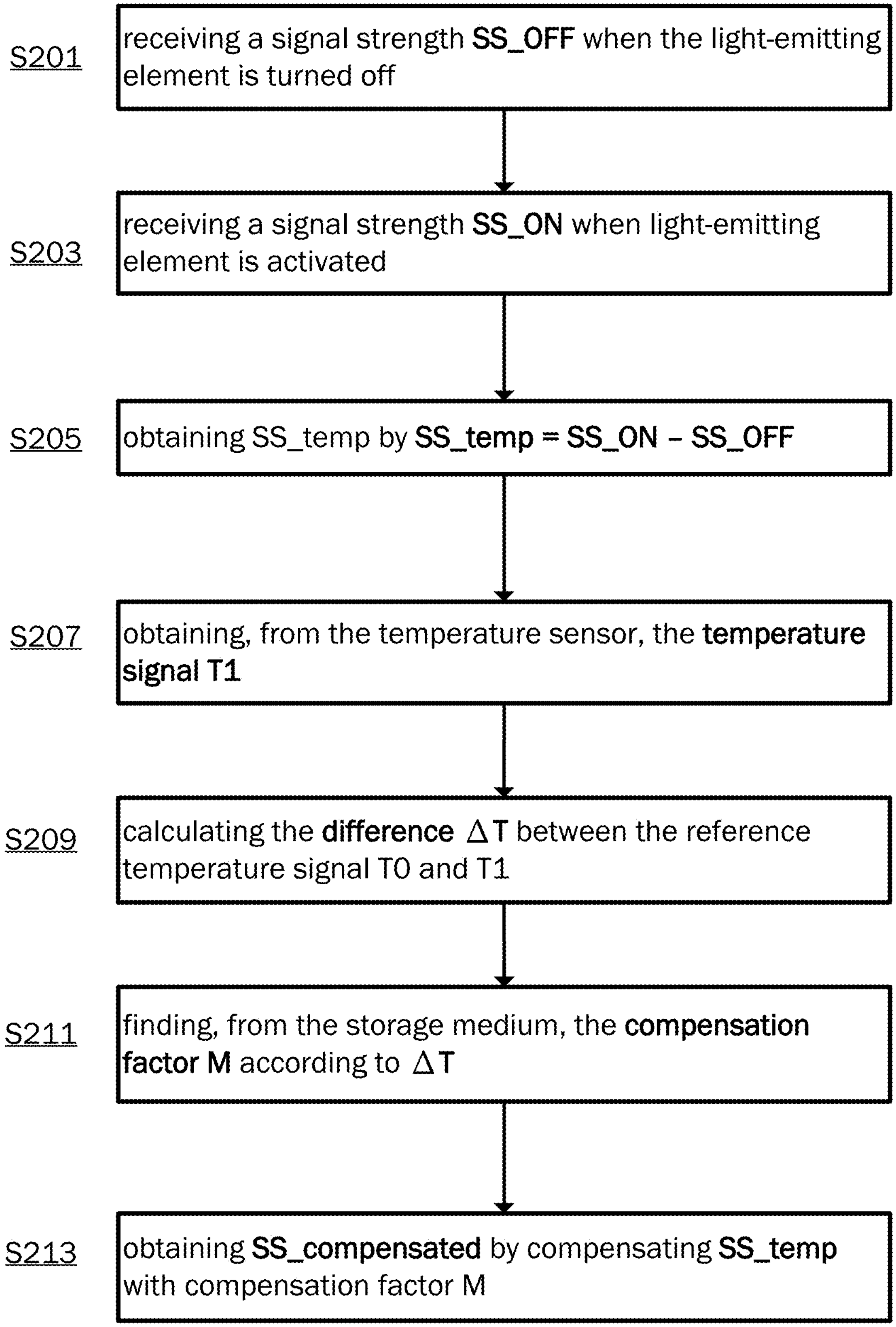
FIG. 2 shows a temperature compensation flow of an optical sensor device in accordance with one embodiment of the present disclosure.

FIG. 2 shows a temperature compensation flow of an optical sensor device in accordance with one embodiment of the present disclosure. Referring to FIG. 1A and FIG. 2, as shown in step S201, when the compensation process starts, the light-emitting element 101 is turned off and the light-receiving element 102 is activated, and the light-receiving element 102 detects a signal regarded as a reference noise. The temperature compensation unit 105 receives a signal strength SS_OFF from the light-receiving element 102 when the light-emitting element 101 is turned off. In an embodiment, the temperature compensation unit 105 receives an ADC code ADC_OFF from the A/D circuit 103, which represents the signal strength SS_OFF.

As shown in step S203, the temperature compensation unit 105 receives a signal strength SS_ON from the light-receiving element 102 when the light-emitting element 101 is activated. In an embodiment, the temperature compensation unit 105 receives an ADC code ADC_ON from the A/D circuit 103, which represents the signal strength SS_ON.

Then, as shown in step S205, the temperature compensation unit 105 obtains signal strength SS_temp determined by a function SS_temp=SS_ON−SS_OFF. In an embodiment, the temperature compensation unit 105 obtains ADC_temp determined by a function ADC_temp=ADC_ON−ADC_OFF to represent the signal strength SS_temp. In general, the variation of the sensing signal (e.g., ADC output) caused by the changes in ambient temperature may come from the temperature characteristics of both the light-emitting element 101 and the light-receiving element 102. Through steps S201-S205, the variation of the sensing signal caused by the light-receiving element 102 can be largely eliminated.

Subsequently, as shown in step S207, the temperature compensation unit 105 obtains a temperature signal T1 representing the ambient temperature from the temperature sensor 106. Then, as shown in step S209, the temperature compensation unit 105 obtains the temperature difference ΔT between a calibrated reference temperature signal T0 and the temperature signal T1. The calibrated reference temperature signal T0 can be set to a value representing room temperature (e.g., 25° C.) or a value representing a temperature of the assembly factor where the initial calibration was performed.

As shown in step S211, the temperature compensation unit 105 determines the compensation factor M from the temperature variation data of light-emitting element (LEE) 110 in the storage medium 107 according to the temperature difference ΔT. The temperature variation data of light-emitting element (LEE) 110 can be obtained from the temperature characteristic of the light-emitting element, which can be measured during manufacture or obtained from the data sheet of the light-emitting element. As an example shown in FIG. 3, the temperature characteristic of the light-emitting element can be represented by a rate of change in radiant flux across a temperature range (e.g., a slope of radiant flux values across two temperatures). As temperature increases, the radiant flux of an LED tends to decrease at a largely fixed rate. The rate of which the radiant flux changes with temperature can be represented as the compensation factor M.

Figure 3:
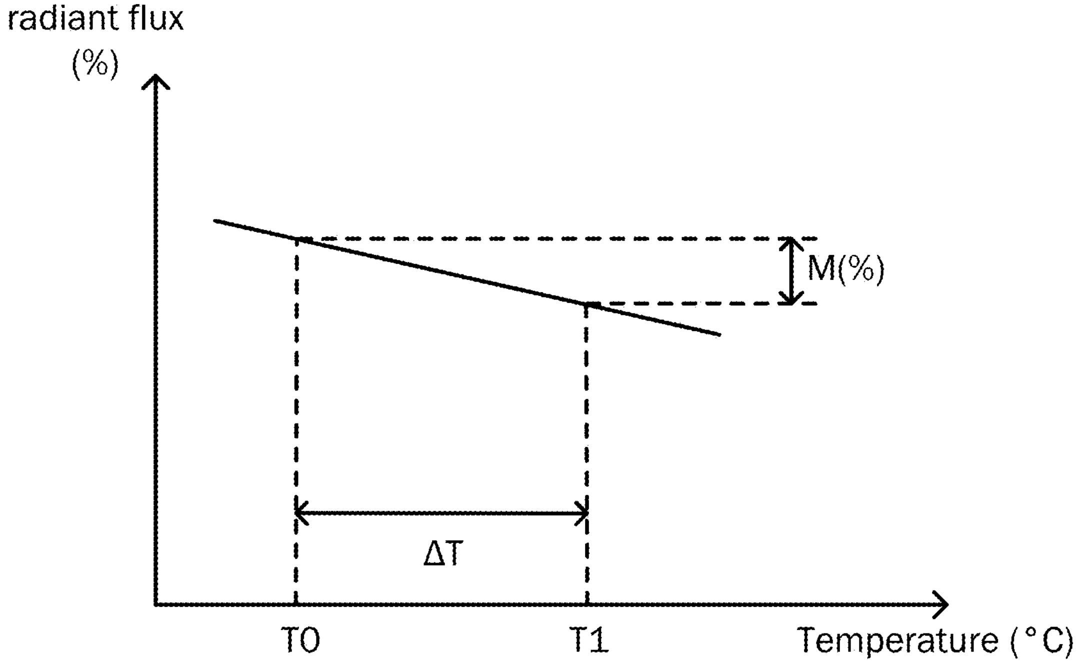
FIG. 3 shows a rate of change in radiant flux of a light-emitting element in accordance with one embodiment of the present disclosure.

Next, as shown in step S213, the temperature compensation unit 105 compensates the signal strength SS_temp with the compensation factor M to obtain a compensated signal strength SS_compensated that is not affected by the ambient temperature. For example, as shown in FIG. 3, the compensation factor M is obtained from the rate of change in radiant flux across the temperature difference ΔT, and the SS_compensated can be determined by a function SS_compensated=SS_temp/M. In an embodiment, the temperature compensation unit 105 compensates ADC_temp with the compensation factor M to obtain ADC_compensated. In this step, the temperature variation of the sensing signal caused by the light-emitting element 101 can be compensated. Subsequently, the temperature compensation unit 105 provides the compensated signal strength that is not affected by the ambient temperature to the analyzer 108 for subsequent processing, so that more accurate detection results can be obtained. In another embodiment, the compensation factor M may include the temperature characteristics of the light-receiving element, for example, a rate of change in the signal strength across a temperature range when light-emitting element 101 is turned off, and/or a rate of change in the signal strength across a temperature range when light-emitting element 101 is activated (e.g., due to change in quantum efficiency and/or noise level). The rate of change in the signal strength can be derived according to the variation of ADC codes generated by the A/D circuit during a loopback test of the manufacturing process. The compensation method of the present disclosure utilizes simple mathematical algorithms and less storage space, which can reduce manufacturing costs.

Figure 4A:
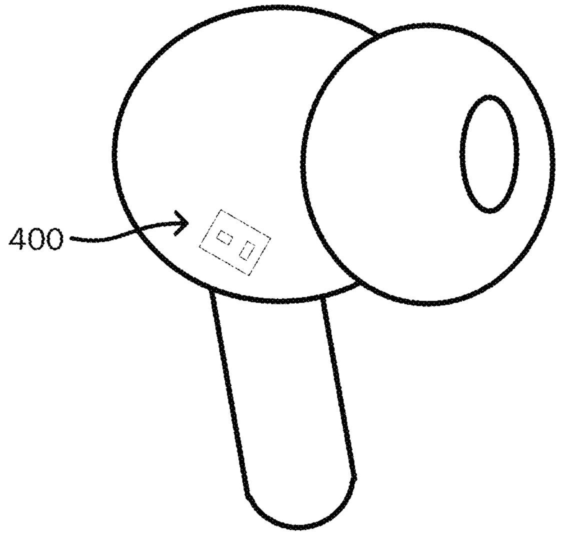
FIG. 4A shows an earbud including an optical sensor device in accordance with one embodiment of the present disclosure.
Figure 4B:
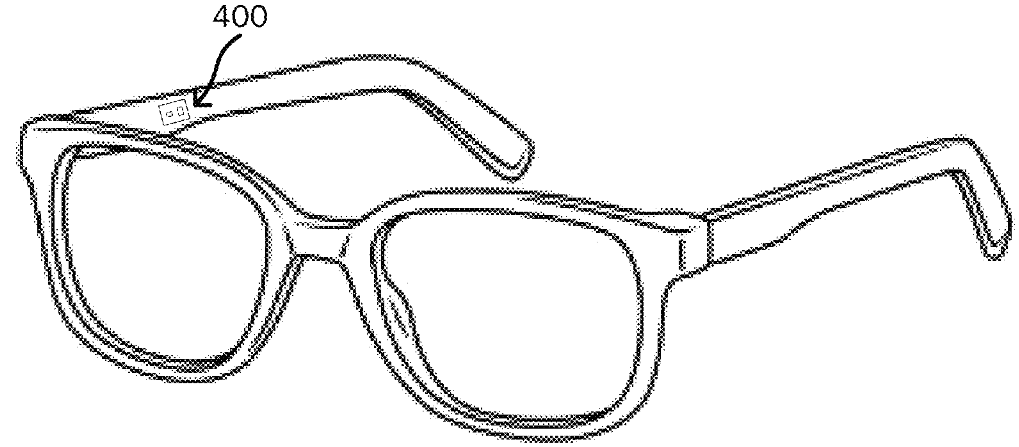
FIG. 4B shows a pair of glasses including an optical sensor device in accordance with one embodiment of the present disclosure.

FIGS. 4A~4B show different wearable devices including the optical sensor device in accordance with different embodiments of the present disclosure. FIG. 4A shows an earbud including an optical sensor device 400. When the user wears the earbud to listen to music or communicate, the optical sensor device 400 contacts the skin of the user and can be configured to measure various bioinformation at the same time. FIG. 4B shows a pair of glasses including an optical sensor device 400. When the user wears a pair of glasses, the optical sensor device 400 contacts the skin of the user and can be configured to measure various bioinformation at the same time. The optical sensor device 400 can be one of the aforementioned optical sensor devices. FIGS. 4A~4B show two examples of wearable devices, however suitable wearable devices such as helmet, wristband, watch, can be installed the optical sensor device to measure various bioinformation.

Various means can be configured to perform the methods, operations, and processes described herein. For example, any of the systems and apparatuses (e.g., optical sensor devices and related circuitry) can include unit(s) and/or other means for performing their operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data register(s), database(s), and/or other suitable hardware.

As used herein, the terms such as "first", "second", "third", etc. describe various elements, components, regions, layers and/or sections, these elements, components, regions, layers and/or sections should not be limited by these terms. These terms may be only used to distinguish one element, component, region, layer, section, signal, or operation from another. The terms such as "first", "second", "third", etc. when used herein do not imply a sequence or order unless clearly indicated by the context. The terms "light-receiving", "light-detecting", "light-sensing" and any other similar terms can be used interchangeably.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. may be used to illustrate method operations. Such identifiers are provided for the ease of the reader and do not denote a particular order of steps or operations. An operation illustrated by a list identifier of (a), (i), etc. can be performed before, after, and/or in parallel with another operation illustrated by a list identifier of (b), (ii), etc.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical sensor device configured to perform detection of an object, comprising:
- a light-emitting element configured to emit light to the object;
- a light-receiving element configured to sense reflected light from the object;
- a temperature sensor configured to provide a temperature signal in response to an ambient temperature;
- a temperature compensation unit coupled to the temperature sensor to read the temperature signal and configured to perform a temperature compensation process to generate a compensated signal strength; and
- an analyzer coupled to the temperature compensation unit and configured to receive the compensated signal strength to process and to generate a detection result,
- wherein the temperature compensation process comprises:
  - receiving a first signal strength (SS_OFF) when the light-emitting element is turned off;
  - receiving a second signal strength (SS_ON) when the light-emitting element is activated;
  - obtaining a compensation factor according to the temperature signal; and
  - generating the compensated signal strength based on the first signal strength (SS_OFF), the second signal strength (SS_ON), and the compensation factor.

2. The optical sensor device of claim 1, wherein the temperature compensation process comprises calculating a third signal strength from a difference between the second signal strength (SS_ON) and the first signal strength (SS_OFF).

3. The optical sensor device of claim 2, wherein the temperature compensation process comprises compensating the third signal strength with the compensation factor to generate the compensated signal strength.

4. The optical sensor device of claim 1, further comprising a storage medium coupled to the temperature compensation unit to store a temperature variation data of the light-emitting element.

5. The optical sensor device of claim 4, wherein the compensation factor is obtained from the temperature variation data of the light-emitting element according to the temperature signal.

6. The optical sensor device of claim 1, wherein the temperature compensation process comprises calculating a temperature difference (ΔT) between a reference temperature signal and the temperature signal.

7. The optical sensor device of claim 6, wherein the reference temperature signal is represented as room temperature.

8. The optical sensor device of claim 6, wherein the compensation factor is obtained according to the temperature difference.

9. The optical sensor device of claim 1, wherein the compensation factor is determined based on a rate of change in radiant flux of the light-emitting element across a temperature.

10. The optical sensor device of claim 9, wherein the compensation factor is further determined based on a rate of change in quantum efficiency of the light-receiving element across a temperature.

11. The optical sensor device of claim 1, wherein the analyzer is configured to perform at least one of skin detection, a bio-information calculation, and substance detection.

12. The optical sensor device of claim 1, further comprising an A/D circuit coupled between the light-receiving element and the temperature compensation unit.

13. The optical sensor device of claim 12, wherein the A/D circuit is configured to convert an analog signal received from the light-receiving element into a digital signal representing signal strength.

14. A method of temperature compensation of an optical sensor device that comprises a light-emitting element, a light-receiving element, a temperature sensor, and a temperature compensation unit, comprising:
- receiving, by the temperature compensation unit, a first signal strength (SS_OFF) when the light-emitting element is turned off;
- receiving, by the temperature compensation unit, a second signal strength (SS_ON) when the light-emitting element is activated;
- providing, by the temperature sensor, a temperature signal in response to an ambient temperature;
- obtaining, by the temperature compensation unit, a compensation factor according to the temperature signal; and
- generating, by the temperature compensation unit, a compensated signal strength according to the first signal strength (SS_OFF), the second signal strength (SS_ON), and the compensation factor.

15. The method of claim 14, further comprising calculating, by the temperature compensation unit, a third signal strength from a difference between the second signal strength (SS_ON) and the first signal strength (SS_OFF).

16. The method of claim 15, further comprising compensating, by the temperature compensation unit, the third signal strength with the compensation factor to generate the compensated signal strength.

17. The method of claim 14, further comprising obtaining, by the temperature compensation unit, the compensation factor from a storage medium according to the temperature signal.

18. The method of claim 14, further comprising calculating, by the temperature compensation unit, a temperature difference (ΔT) between a reference temperature signal and the temperature signal.

19. The method of claim 18, wherein the reference temperature signal is represented as room temperature.

20. The method of claim 18, wherein the compensation factor is obtained according to the temperature difference.

* * * * *